(12) United States Patent
Burland et al.

(10) Patent No.: US 7,550,666 B2
(45) Date of Patent: Jun. 23, 2009

(54) ELECTRICAL-CABLE SHIELDING (75) Inventors: Gregory Neil Burland, London (GB); Nicholas Jones, Camberley Surrey (GB)

(73) Assignee: ICORE International Limited, Berkshire (GB)

( * ) Notice: Subject to any disclaimer, the term of this patent is extended or adjusted under 35 U.S.C. 154(b) by 0 days.

(21) Appl. No.: 12/095,350

(22) PCT Filed: Nov. 29, 2006

(86) PCT No.: PCT/GB2006/004467

§ 371 (c)(1),
(2), (4) Date: Aug. 21, 2008

(87) PCT Pub. No.: WO2007/063304

PCT Pub. Date: Jun. 7, 2007

(65) Prior Publication Data

US 2008/0296037 A1 Dec. 4, 2008

(30) Foreign Application Priority Data

Nov. 29, 2005 (GB) ................................. 0524346.4
Nov. 3, 2006 (GB) ................................. 0621955.4

(51) Int. Cl.
*H01B 11/06* (2006.01)
(52) U.S. Cl. ........................................................ 174/36
(58) Field of Classification Search .................... 174/36, 174/74 R, 71 R, 72 R, 72 A, 88 C
See application file for complete search history.

(56) References Cited

U.S. PATENT DOCUMENTS

| 4,640,980 A | 2/1987 | Batt et al. |
| 4,731,500 A | 3/1988 | Otsuka |
| 5,414,212 A | 5/1995 | Clouet et al. |
| 6,066,800 A | 5/2000 | Renaud |
| 6,160,216 A | 12/2000 | McMahon |

FOREIGN PATENT DOCUMENTS

| DE | 195 43 016 | 5/1997 |
| EP | 0165861 | 12/1985 |
| EP | 0448230 | 9/1991 |
| JP | 6152177 | 5/1994 |

*Primary Examiner*—Chau N Nguyen
(74) *Attorney, Agent, or Firm*—Davis & Bujold, P.L.L.C.

(57) ABSTRACT

An electrical-cable transition, where two or more bundles of shielded cables divide from a shielded main bundle, is shielded from electromagnetic interference by a flexible shielding-element of bare or covered metal mesh wrapped round the transition to overlap or be overlapped by shielding of the branch bundles and interconnect electrically with it under straps. The flexible element may be an end-pad of wrapped shielding of the main bundle that envelops the shielded branch bundles and is closed onto them. Alternatively, it may be a separate shielding element that is clamped by a clip or strap onto the shielding of the main bundle to sandwich folded-tags drawn out from the ends of the branch-bundle shields, onto a metal ring or collar through which the main-bundle cables pass before separating into the branch bundles. The separate element is closed tightly onto the individual branch bundles by draw-strings, ties or other fasteners.

30 Claims, 8 Drawing Sheets

ELECTRICAL-CABLE SHIELDING

This is a national stage completion of PCT/GB2006/004467 filed Nov. 29, 2006 which claims priority from British Application Serial No. 0524346.4 filed Nov. 29, 2005 and British Application Serial No. 0621955.4 filed Nov. 3, 2006.

FIELD OF THE INVENTION

This invention relates to electrical-cable shielding, and is concerned particularly with bundles of electrical cables shielded against electromagnetic interference, and methods of such shielding of electrical-cable bundles.

BACKGROUND OF THE INVENTION

In order to provide effective shielding of a bundle of electrical cables against electromagnetic interference it is necessary to ensure that the shield has electrical continuity and that connection to ground is of low resistance. Where there is to be a transition in the cabling run for dividing or branching the bundle into two or more smaller bundles, it is normal to interrupt the shield and insert a solid, usually metal, branching fitting to which the individual shields of the main and branch bundles are each attached to maintain continuity of shielding. A ground-bonding connection is usually made directly to the branching fitting.

The use of solid fittings as referred to above for cable-branching transitions has disadvantages in that they add weight and bulk to the cabling and increase costs. It is an object of the present invention to provide electrical-cable branching-transitions, and methods for providing such transitions, for which shielding against electromagnetic interference is maintained and the above disadvantages are, at least to a significant extent, overcome.

According to one aspect of the invention there is provided a method of providing an electrical-cable transition at which a shielded bundle of cables of a cabling run is divided into two or more shielded branch-bundles, wherein continuity of shielding of the cabling run against electromagnetic interference is maintained through the transition by wrapping a flexible shielding element round the branch bundles and the main bundle (that is to say, the bundle from which the branch bundles are divided) to envelop them all together at the transition as one and overlap, or be overlapped by, shielding of each of the branch bundles, and establishing electrical interconnection of the flexible shielding element with the shielding of the individual branch bundles.

According to another aspect of the invention there is provided an electrical-cable transition at which a shielded bundle of cables of a cabling run is divided into two or more individually-shielded branch-bundles, comprising a flexible shielding element wrapped round the branch bundles and the main bundle (that is to say, the bundle from which the branch bundles are divided) to envelop them all together as one at the transition and overlap, or be overlapped by, shielding of each of the branch bundles, and wherein the flexible shielding element is electrically interconnected with the shielding of the branch bundles for maintaining continuity through the transition of shielding of the cabling run against electromagnetic interference.

SUMMARY OF THE INVENTION

The method and cable-transition of the present invention avoid the need for a solid fitting in maintaining electrical continuity in shielding. This may be achieved where the flexible shielding element provides shielding of the main bundle before the division as well as enveloping the main and branch bundles at the transition, or where the main bundle is provided with its own individual shielding separate from that provided by the flexible shielding element, in which case the flexible shielding element may overlap or be overlapped by the shielding of the main bundle. In the latter case the flexible shielding element may be clamped individually to each of the main and branch bundles, or the shieldings of the main and individual branch bundles may all be clamped together with the flexible shielding element at the transition. The clamping may be achieved by one or more straps or clips encircling and compressing the cable-bundle, and may involve a degree of resilience. For example in the latter respect, the straps may have elasticity and/or a spring device or other contributor of resilience may be introduced into the cable-bundle itself.

The division of the main bundle of cables into the branch bundles is to be understood as being possibly of only one of the cables of the main bundle into one branch bundle and the remainder into one or more other branch bundles. Therefore, a 'branch bundle' in the sense in which this term is used herein, may be of a single cable or a plurality.

The flexible shielding element may be of woven, knitted or braided metal wires, or woven, knitted or braided metal-coated filaments, and may have an attached layer or layers of plastics or other electrically-insulating material.

BRIEF DESCRIPTION OF THE DRAWINGS

Electrical-cable transitions, and methods for providing such transitions, in accordance with the present invention will now be described, by way of example, with reference to the accompanying drawings, in which.

DETAILED DESCRIPTION OF THE INVENTION

For simplicity of representation only a small number of electrical cables are represented as involved in the transitions shown in the drawings. In practice there are likely to be many more than represented.

The electrical-cable bundles involved in the shielded transitions to be described with reference to FIGS. 5 to 11 are all shielded from electromagnetic interference using shielding tape of the form illustrated in FIGS. 1 to 3 and now to be described.

Figure 1:
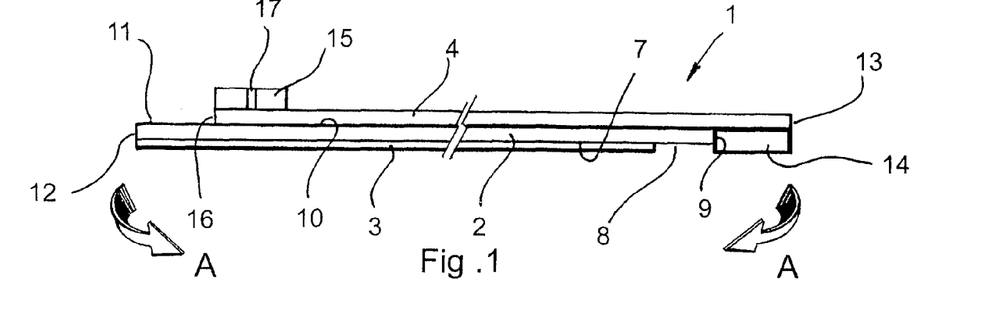
FIG. 1 is a representative cross-section of tape used in the shielding of the electrical-cable branching transitions in each of the examples to be described.
Figure 2:
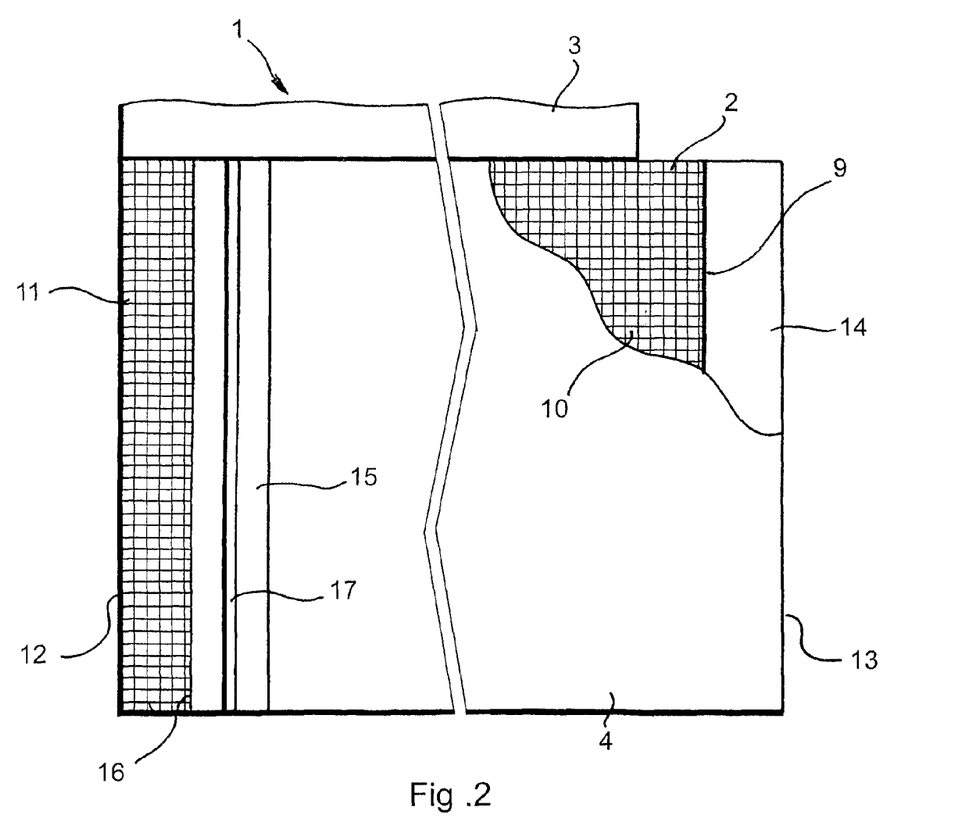
FIG. 2 is illustrative of a plan view of the tape of FIG. 1.

Referring firstly to FIGS. 1 and 2, the shielding tape 1 used is of a three-layered, light-weight construction including a woven mesh 2 of bare metal-wire strands (for example, in a twill weave). The mesh 2 is sandwiched between inner and outer electrically-insulating layers 3 and 4 respectively. The layers 3 and 4 are formed by strips of plastics sheet (the thicknesses of the layers 3 and 4 and the mesh 2 are exaggerated in the drawings). More particularly, the inner layer 3 is, for example, of polytetrafluoroethylene (PTFE) or polyvinyl chloride (PVC), and the outer layer 4 is of a hard-wearing plastics material, for example, a ketone-based resin such as polyetheretherketone (PEEK), for providing physical strength with resistance to abrasion.

Figure 3:
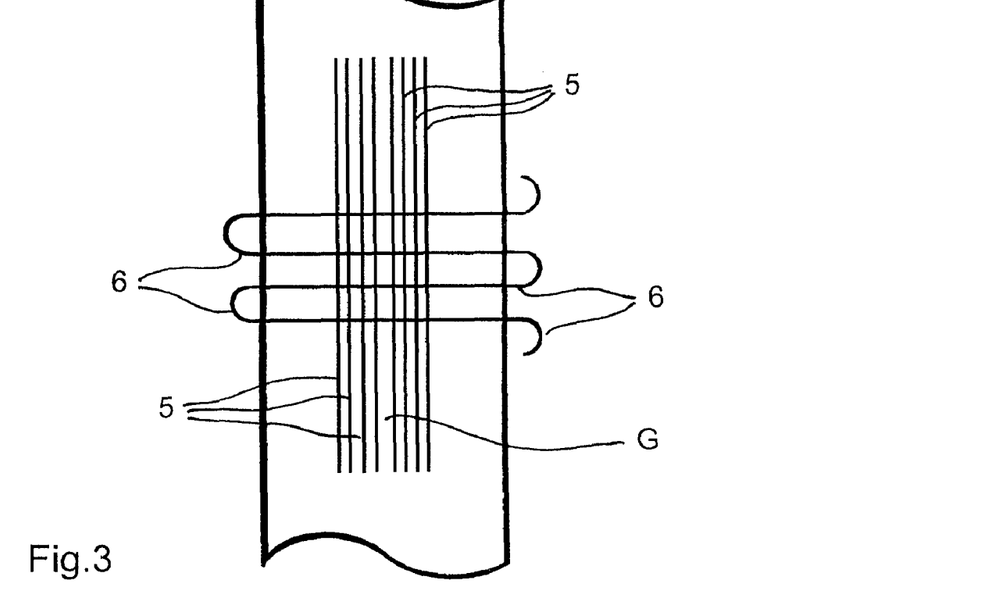
FIG. 3 is illustrative schematically of the weave of a wire-mesh that forms part of the tape of FIGS. 1 and 2.

As indicated schematically in FIG. 3, the warp of the woven mesh 2 is formed by fine wire-strands 5 that run lengthwise of the tape 1, whereas the weft is formed by a fine wire-strand 6 running back and forth without break, in a narrow-fabric weave with the warp strands 5. The strands 5 and 6 are, for example, single wire-filaments or twisted pairs, of nickel-coated copper wire, and the strands 5 are fine enough that a group (in the case illustrated, of four) of them are drawn together through the dent-space of the loom in the weaving process; the gap G between the adjacent groups, resulting from the dents (and shown exaggerated in FIG. 3), is small enough that it does not materially affect the shielding provided.

The inner layer 3 is of a width to cover the inside face 7 of the woven mesh 2 apart from throughout a longitudinal marginal strip 8 of the face 7 at one longitudinal edge 9 of the bare mesh 2. The outer layer 4 correspondingly covers the outside face 10 of the mesh 2 apart from throughout a longitudinal marginal strip 11 of the face 10 at the other longitudinal edge 12 of the mesh 2. An edge 13 of the layer 4 lies beyond the edge 9 of the mesh 2 to carry a strip 14 of upstanding fibres that abuts the edge 9.

The strip 14 forms in conjunction with a second strip 15 of upstanding fibres, a pair of interengaging elements of a selectively-disengageable fabric-fastening of the kind, such as that sold under the Registered Trade Mark VELCRO, in which hook-ended fibres of one element engage with upstanding loop-ended fibres of a second element; in this case, for example, the element 14 has the loop-ended fibres and the strip 15 has the hook-ended fibres. The strip 151 which is supported along the opposite edge 16 of the layer 4, has a central, red-coloured line 17 running throughout its length.

The mesh 2 together with the layers 3 and 4 and the strips 14 and 15 are retained in assembly with one another by stitching.

The tape 1 is used for electromagnetic shielding of a bundle of cables as will now be described with reference to FIG. 4.

Figure 4:
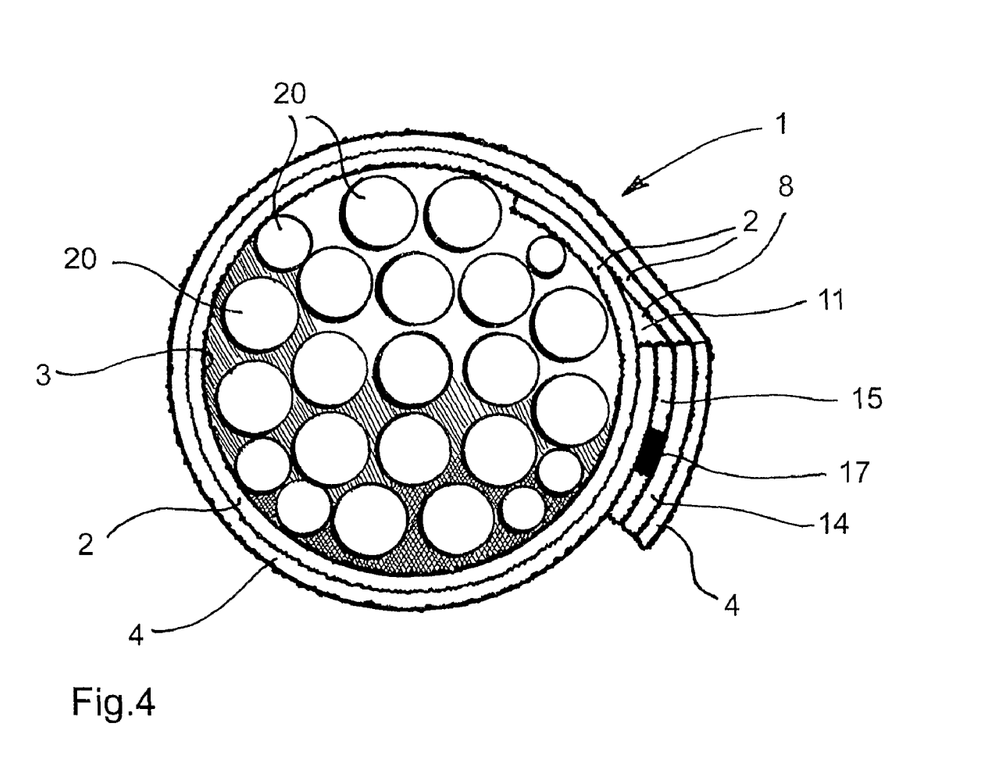
FIG. 4 is a cross-sectional view of a bundle of electrical cables wrapped in the tape of FIGS. 1 to 3 for electromagnetic shielding of the cable-bundle.

Referring principally to FIG. 4, the tape 1 is deployed running lengthwise of the bundle of electrical cables 20 with the inner layer 3 abutting the cables 20 of the bundle. The tape 1 is now wrapped widthwise round the bundle by folding its longitudinal margins round the bundle as indicated generally by arrows A in FIG. 1. Wrapping of the tape 1 round the bundle is carried through to bring the margin 8 into overlap with the margin 11 and engagement of the element 14 onto the element 15 throughout the full length of the tape 1. Sufficiency of the area of engagement between the element 14 and the element 15 at each position throughout the length of the tape 1, so as to ensure that the tape 1 is correctly wrapped and secured, is confirmed if the red line 17 cannot be observed anywhere along that length.

When the tape 1 is correctly wrapped, the margins 8 and 11 of the woven mesh 2 are in hard abutment with one another so as to ensure that there is good electrical contact between them and that optimum shielding is provided. With such contact, there is complete closed-circuit encirclement of the bundle, and low-resistance connection of that circuit with the weft strand 6 and each warp strand 5. The strands 5 and 6 are clamped into couplings (not shown) at either end of the bundle to ensure good ground connection. Moreover, the shortest possible path for discharge from and lengthwise of the bundle is provided by the warp strands 5 running longitudinally of the shielding tape 1; this is of especial importance for lightning protection.

The shielding tape 1 is used as described above for electromagnetic shielding of individual bundles of cables throughout their lengths, but may also be used as will be described, to establish screening according to the present invention throughout cable-transitions where a bundle is divided into two or more branch bundles. A first example of a screened transition according to the invention will now be described with reference to FIGS. 5 and 6.

Figure 5:
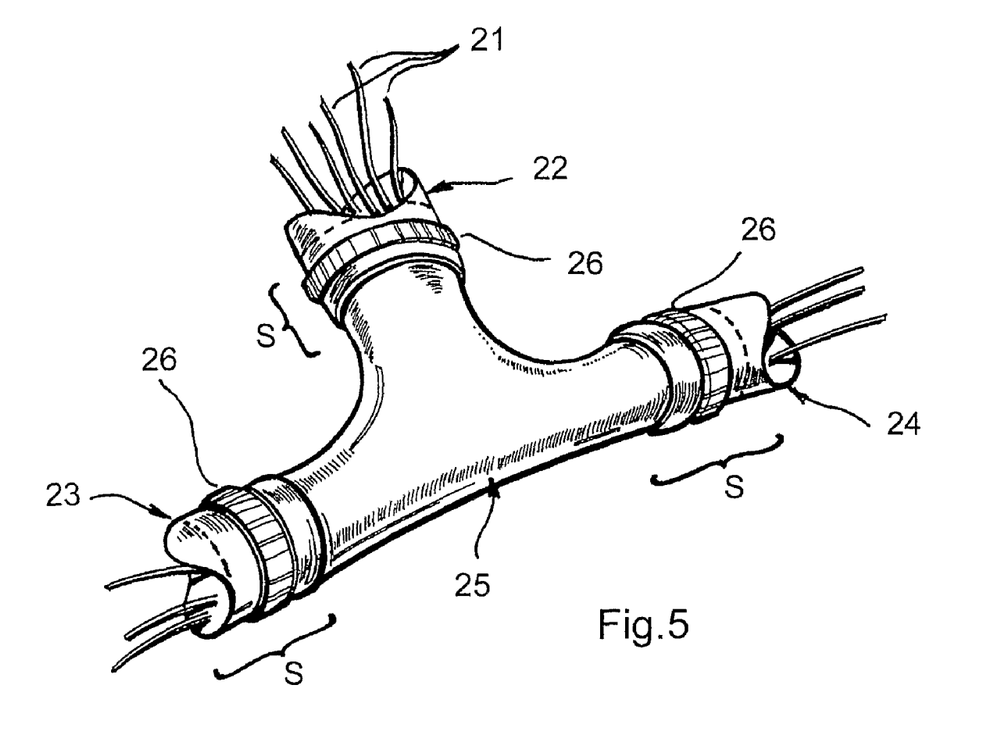
FIGS. 5 and 6 are illustrative of a first electrical-cable transition according to the invention.
Figure 6:
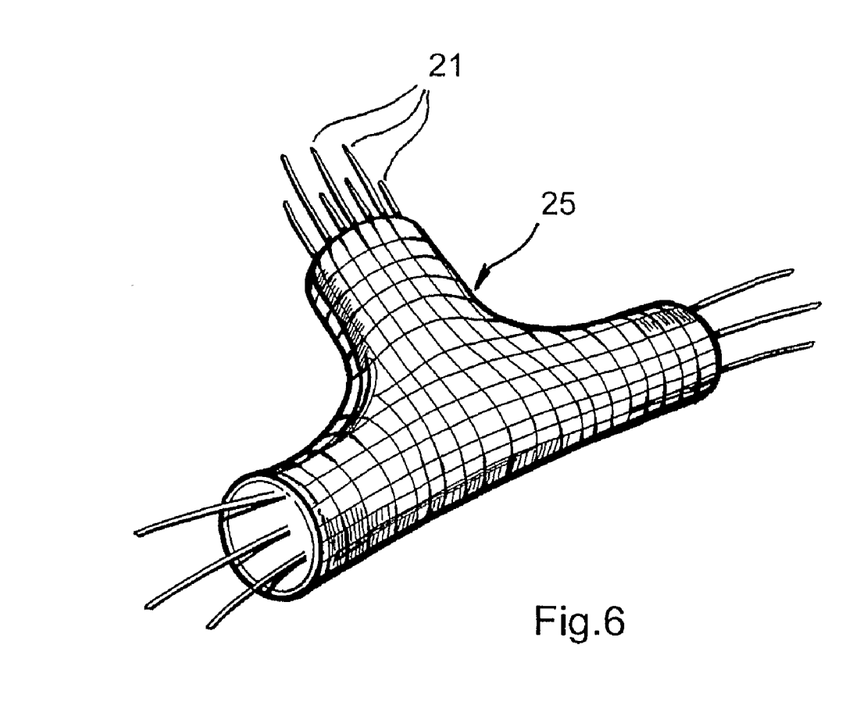

Referring to FIG. 5, the cables 21 of a shielded cable-bundle 22 in this example divide into two oppositely-directed branches or sub-bundles 23 and 24 (only a few of the cables in each bundle are shown schematically in FIG. 5, and correspondingly in FIG. 6, for simplicity of illustration). The bundles 22 to 24 are individually shielded against electromagnetic interference using wrapped tape of the form of the tape 1 described above with reference to FIGS. 1 to 4. The electrically-conductive mesh 2 (not shown) of the shielding tape 1 of each bundle 22 to 24 is interconnected electrically with the corresponding mesh 2 of the shielding tape 1 of each other bundle 22 to 24 via a flexible shielding element 25. The element 25, as shown in FIG. 6, is wrapped round the cables 21 where they divide from the bundle 22 into the bundles 23 and 24.

The shielding and protective tape 1 of each bundle 22 to 24 overlaps the element 25 throughout a limited end-region S indicated in FIG. 5. More particularly, the inner insulating layer 3 of the tape 1 is removed throughout this region S so that the mesh 2 of the tape 1 is in face-to-face contact with the element 25. In this respect, the flexible element 25 may simply be, as suggested by the illustration of FIG. 6, an element of bare electrically-conductive mesh or braid (for example a short length of mesh corresponding to the mesh 2 described above with reference to FIGS. 1 to 3), with which the mesh 2 of the overlapping tape 1 makes direct electrical contact. Alternatively, and more in accord with the representation of FIG. 5, it may be a short length of tape constructed in the same manner as the tape 1, having its outer protective layer corresponding to the layer 4 cut back within the overlapping regions S (or omitted altogether) so that good electrical contact is made there.

A strap 26, which may have a degree of elasticity, is tightened onto each individual, shielded bundle 22 to 24 within the region S, so as to urge and retain tight face-to-face electrical contact of the mesh 2 of the shielding tape 1 of that respective bundle, with the element 25. This establishes the desirable low-resistance electrical interconnection of the electromagnetic shielding throughout the cable harness formed by the bundles 22 to 24.

A split-ring may be introduced under the mesh 2 and the element 25 within each overlapping region S so as to add resilience for enhancing the compressive force exerted, and therefore the clamping pressure urging tight face-to-face electrical contact, in that region.

Figure 7:
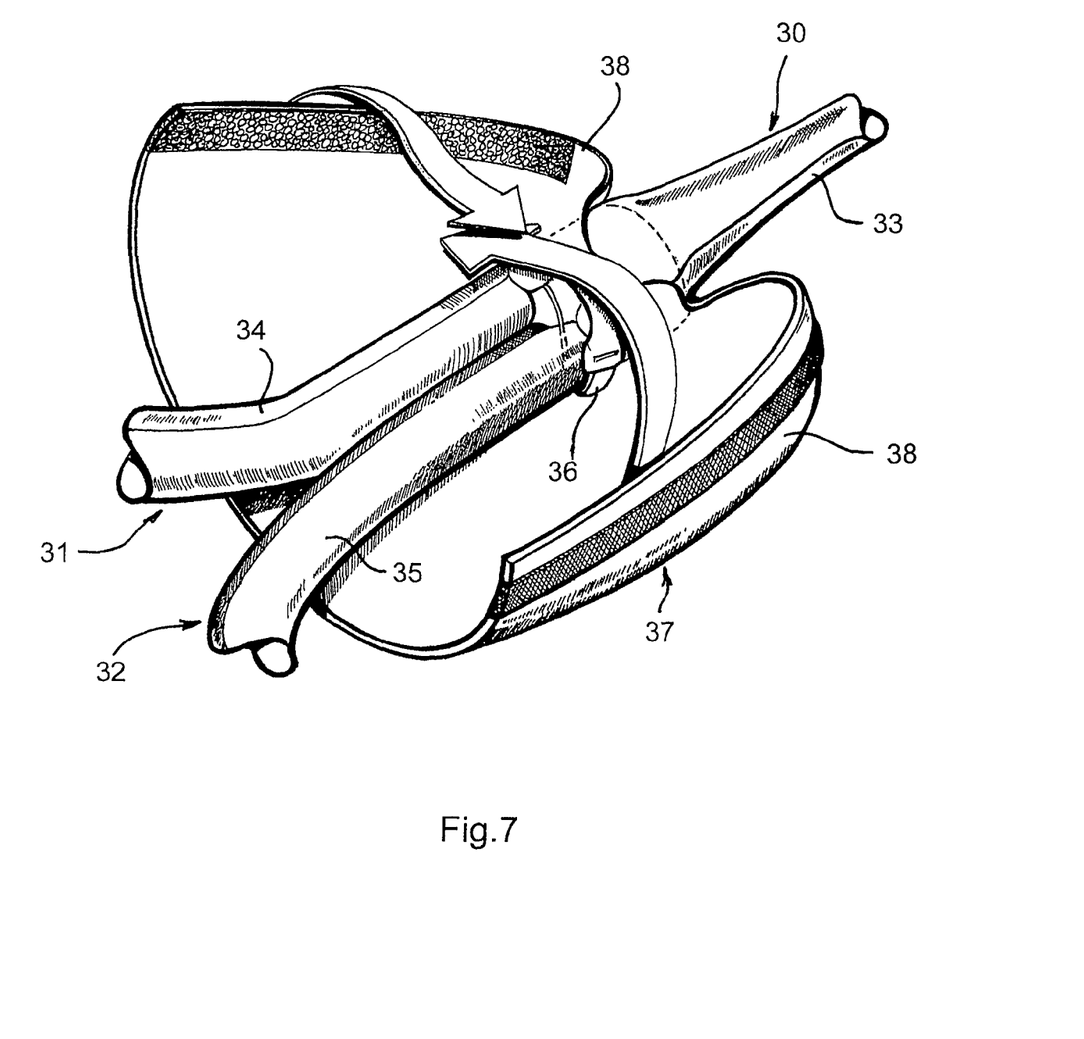
FIGS. 7 to 9 are illustrative of a second form of electrical-cable transition according to the invention.
Figure 8:
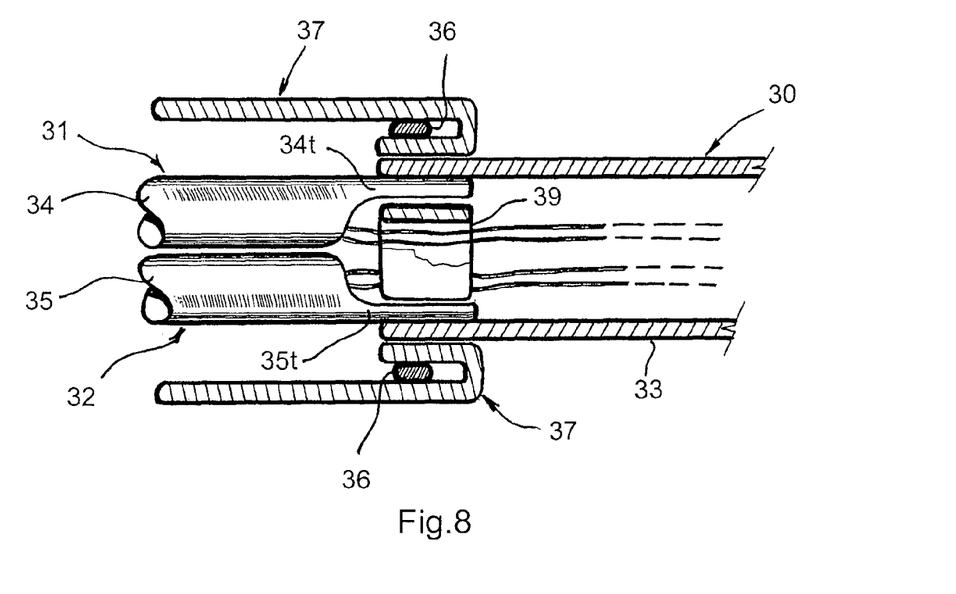
Figure 9:
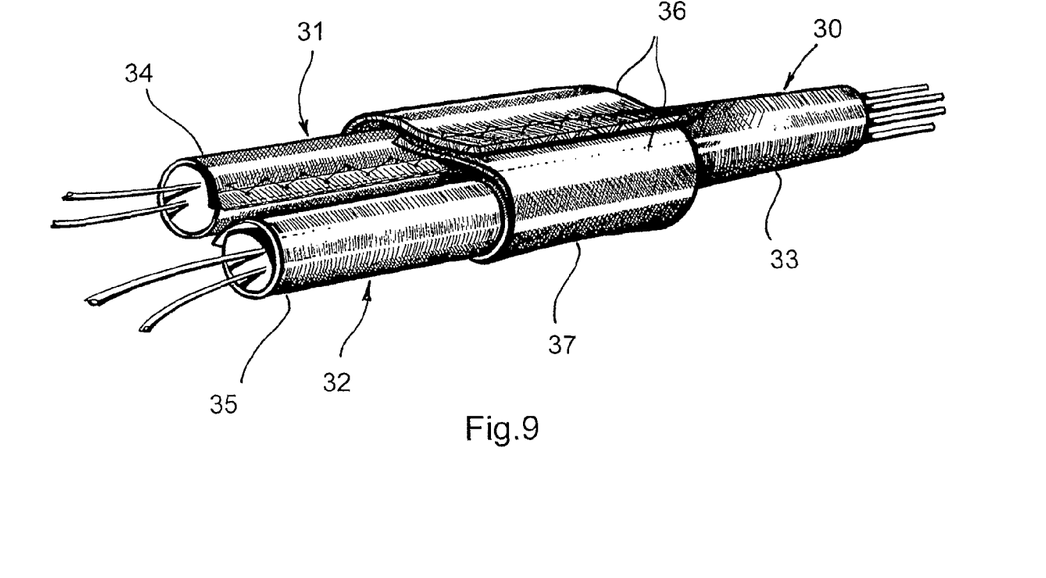

A second form of transition is illustrated by FIGS. 7 to 9, and will now be described.

Referring initially to FIG. 7, a main cable bundle 30 is divided into two branch bundles 31 and 32. The wrapped shielding tape 33 of the bundle 30 is terminated at the point where the division takes place to allow the bundles 31 and 32 to be branched off and provided with their own individual wrapped shielding tapes 34 and 35 respectively. The shielding tapes 33 to 35 are interconnected electrically with one another to form a common bonding point by means of a single metal clamping-clip 36 that embraces the bundles 30 to 32 over their shielding tapes 33 to 35 at the point of division.

Shielding of the transition overall, involves an element 37 of the shielding tape which as shown more clearly in FIG. 8 is inserted under the clip 36 and then folded back over it before being wrapped (as indicated by the arrows in FIG. 7) round the point of division and the bundles 31 and 32 to envelop them, as shown in FIG. 9. The longitudinal margins 38 of the wrapped element 37 overlap one another in hard abutment so as to ensure that there is good electrical contact between them for optimum shielding throughout the transition and its adjoining regions. The tape-element 37 is retained in place by drawing it tight round the bundles 30 to 32 and fastening it by using its fabric-fastening elements 14 and 15, a clip clamping round the clip 36, press-studs and/or draw-strings.

Low-resistance interconnection of the mesh 2 of the shielding element 37 with the mesh 2 of each shielding tape 33 to 35 is established by face-to-face contact with one another under the clamping-clip 36, or by means of one or more bonding straps between them. Although sufficient clamping pressure and consequent electrical contact may be achieved by tightening the clip 36 against the bundle of cables, the pressure and contact may be enhance by tightening it onto an underlying rigid or resilient member inserted in the transition.

More particularly, and as illustrated in FIG. 8, the shielding tapes 34 and 35 are opened up at the ends of the bundles 31 and 32 and with the inner insulating layer 3 of each cut back, are folded in on themselves to form tags 34*t* and 35*t*. These tags 34*t* and 35*t* with the mesh 2 of each bare on the outside, are located over a metal ring or collar 39 (shown partly broken away) through which the cables of the bundle 30 pass for division into the two bundles 31 and 32 (to avoid the need for threading the collar 39 onto the cables, it may be slotted to allow the cables to be fed laterally into it, or split for fitting round them). The end of the tape 33 of the bundle 30 is opened up and its insulating layer 3 is cut back, for folding over and making electrical contact with the tags 34*t* and 35*t* on the collar 39, so that the collar 39 provides a solid (or resilient) base against which the tags 34*t* and 35*t* are sandwiched with the element 37, under the clip 36.

The branch bundles 31 and 32 can be arranged beyond the transition to follow whatever path relative to the main bundle 30, is required for the harness installation. This has the advantage of allowing a greater degree of flexibility in manufacture and installation of the cable harness than in those circumstances where conventional transitions are used, and readily allows for adaptation of, in particular, the installed harness, to changing requirements for branch-bundle disposition and run.

Figure 10:
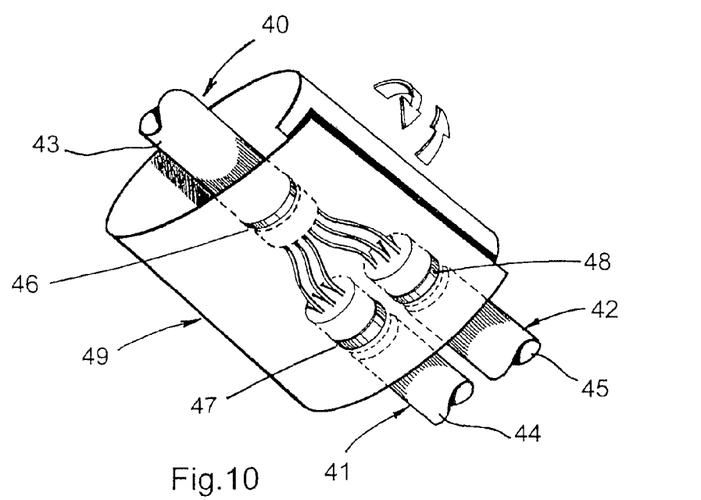
FIGS. 10 to 12 are illustrative of features and detail of a third electrical-cable transition according to the invention.

FIG. 10 is illustrative schematically of a similar shielded transition to that of FIGS. 7 to 9 where a main cable bundle 40 is divided into two branch bundles 41 and 42 and the shielding tapes 43 to 45 of the three bundles 40 to 42 are individually clamped at their ends by clips 46 to 48. Shielding throughout the transition involves wrapping an element 49 of the shielding tape round the bundles 40 to 42 and securing it to envelop them where they divide and the region on either side. The electrical interconnection of the tapes 43 to 45 with the element 49, required in this case may be achieved using the methods illustrated in FIGS. 11 and 12, which will now be described.

Figures 11, 12:
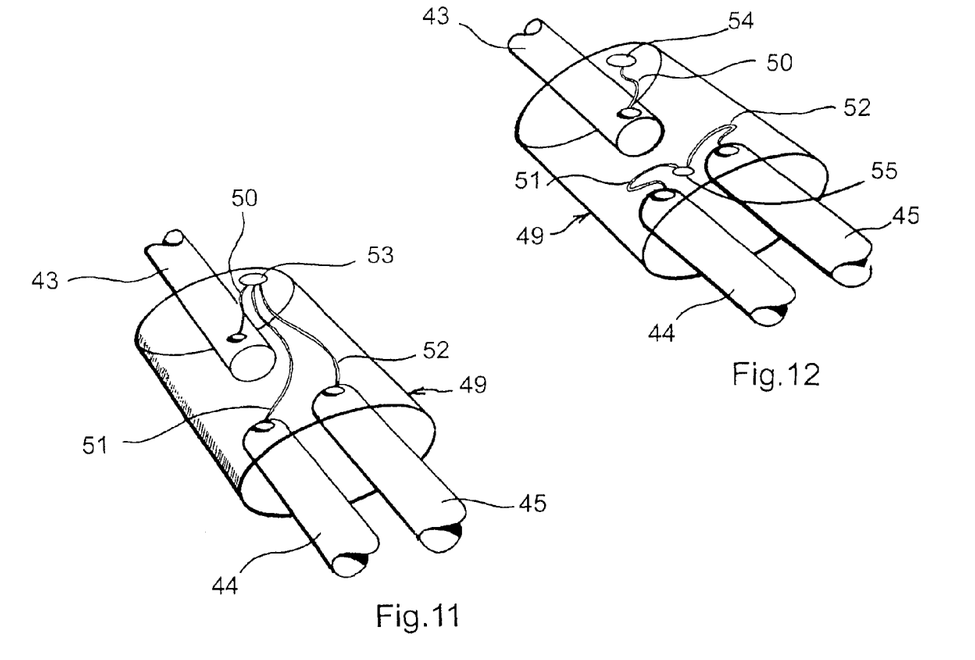

Referring to FIG. 11, low electrical-resistance interconnection is established in this example by flying leads 50 to 52 between the shielding tapes 43 to 45 and a common point 53 on the element 49, so that all shielding is brought to the same potential. In the case illustrated in FIG. 12, on the other hand, the flying lead 50 is attached to a point 54 at one end of the element 49 whereas the flying leads 51 and 52 are attached to a point 55 at the opposite end; this, which establishes the element 49 in series or in parallel with the shielding overall, precludes the possibility of the element 49 acting as an aerial/antenna.

A further example of a transition in which interconnection of the shielding is achieved without the use of flying leads, will now be described with reference to FIGS. 13 and 14.

Figure 13:
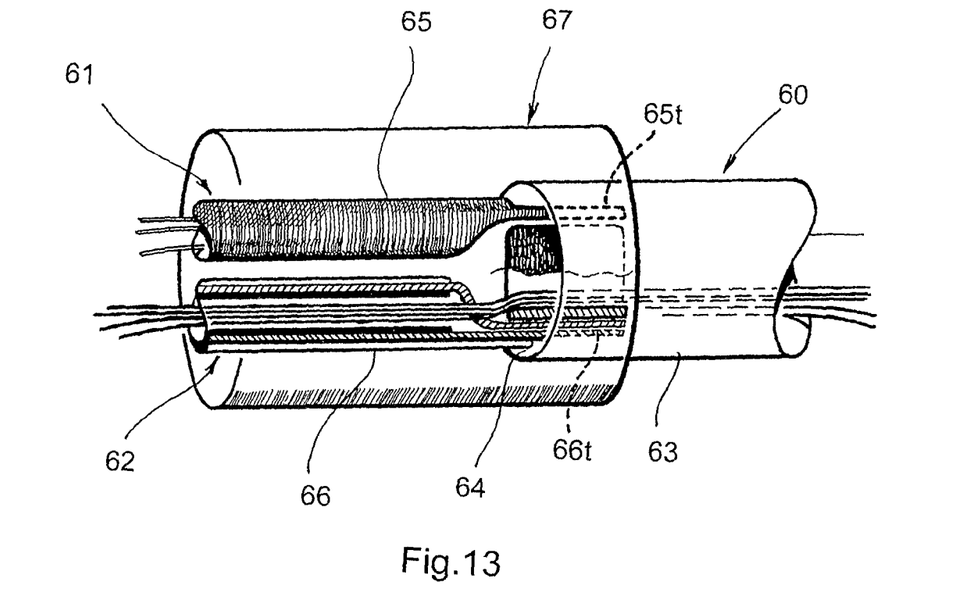
FIGS. 13 and 14 are illustrative of another electrical-cable transition according to the invention.
Figure 14:
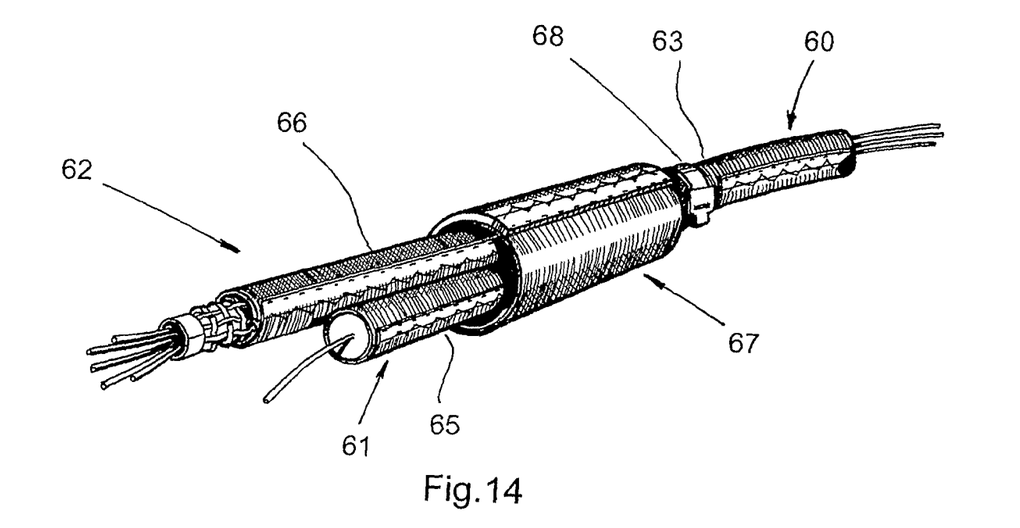

Referring to FIGS. 13 and 14, a main cable bundle 60 is divided into two branch bundles 61 and 62 within the transition, and in emerging from within the wrapped shielding tape 63 of the bundle 60, passes through a metal ring or collar 64 (shown partly broken away) that projects out from within the tape 63. Initial portions of the shielding tapes 65 and 66 wrapped round the branch bundles 61 and 62, are folded in on themselves to form tags 65*t* and 66*t* for extending onto the collar 64 and making bare-metal contact with it. The shielding tape 63 of the main cable bundle 60 extends over the tags 65*t* and 66*t* where they make contact with the collar 64, and an element 67 of the shielding tape is wrapped tightly round this and the adjoining regions of the transition to envelop it. A strap 68 is used to pull the element 67 down tightly over the collar 64, the tape 63 and the tags 65*t* and 66*t*, clamping all of them onto the collar 64 and into good electrical surface contact with one another. A clip or tie may be used as an alternative to the strap 68, and draw-strings, ties, clips, press-studs, fabric-fastening may be used to hold the element 67 closed tightly down onto the individual branch bundles 61 and 62.

The situation in which there is only one cable in a branched bundle is illustrated in the case of the bundle 61 of FIGS. 13 and 14.

Figure 15:
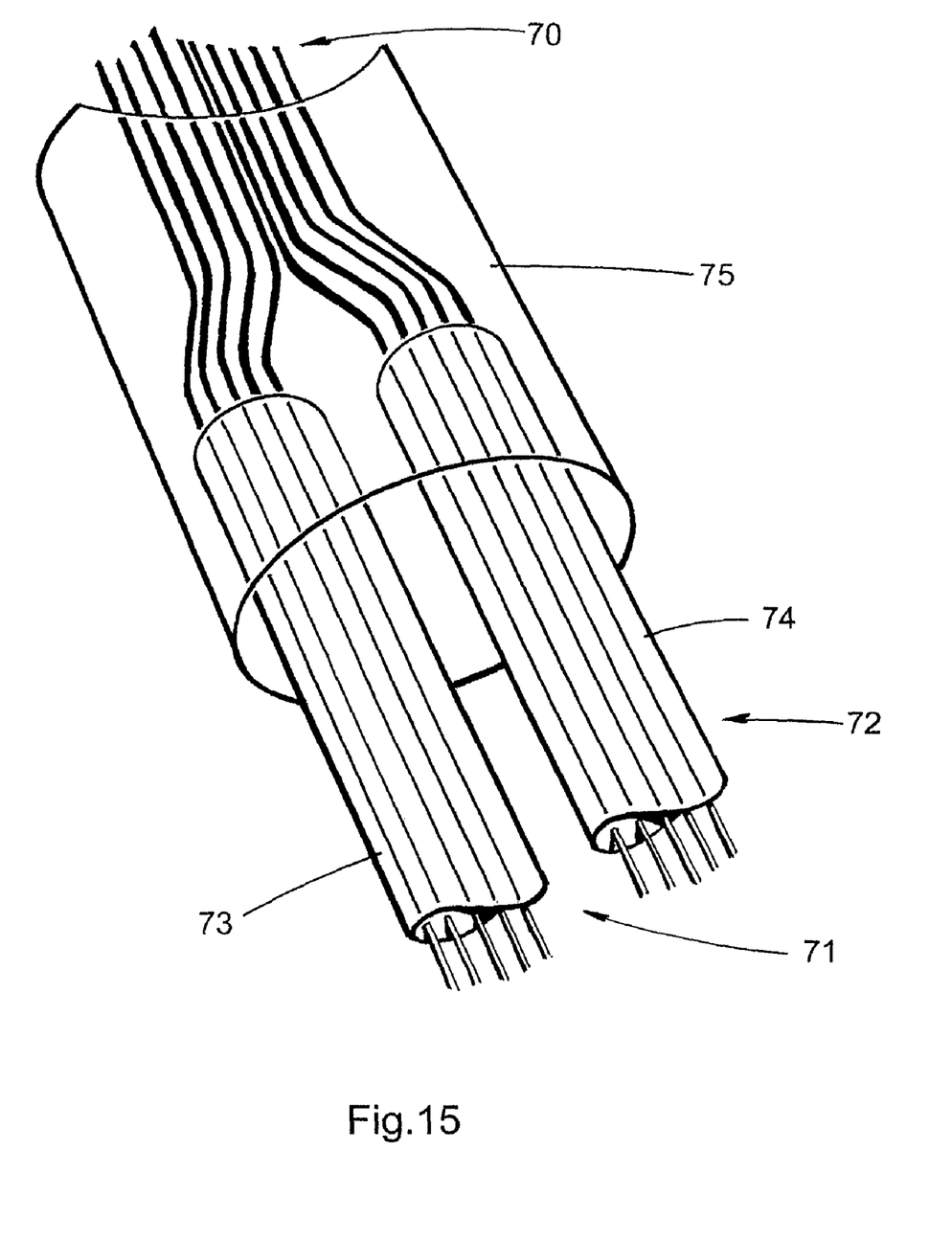
FIG. 15 is illustrative of a further electrical-cable transition according to the invention.

In certain circumstances it may be possible to effect the required shielding of the transition without the need for a separate shielding element enveloping the transition. An example of this is illustrated schematically in FIG. 15, in which a main cable bundle 70 is divided into branched cable bundles 71 and 72, and where the shielding tapes 73 and 74 of the bundles 71 and 72 extend into the shielding tape 75 of the main bundle 70. The tape 75 is wrapped round the bundle 70 to extend over the division into the separate and separately-wrapped branch bundles 71 and 72, and so avoids the necessity for an additional shielding element to shield the cables where the branched transition is made. Clips or other means (not shown) of pulling the tape 75 tightly onto the shielded bundles 71 and 72 in establishing electrical interconnection between the tapes 73 to 75 (at individual positions or at a common point) and closing off the tape 75 round the bundles 71 and 72 would be provided.

Although the branching transitions of the examples described above involve just two branches, they may be readily adapted to provide for more branches than this. Furthermore, there is an inherent flexibility that in general allows for a wide range of variation by choice of the relative orientations of the branches with respect to one another and the main bundle.

The shielded transitions described above have the advantage that the enveloping shield can be readily opened and removed from the harness simply by unwrapping it from main and branch cable bundles. This facilitates easy modification, inspection and repair of the bundles, and is achieved without use or introduction of the conventional metal or other specially-designed and -manufactured transition-component. Additionally, there is the advantage that the shielding and protection is achieved by wrapping an extra layer round the cable bundle, or (in the case of the example of FIG. 15) of not requiring even this, so as to not increase the profile of the bundle materially.

Furthermore, there is the advantage that only a small range of different sizes of shielding tape is required to meet the requirements of a large range of different sizes and configurations of transition. With known transition products using metal or other hard components, a different product is generally required for each combination of main bundle size, number of branch bundles and their sizes and relative orientations. A range of different bundle diameters may be accommodated by providing for the possibility of adjustment of the degree of wrapped overlap of the shield.

With the methods and transitions of the invention electrical shielding protection and surge-current protection are provided through the junction zone. In this respect, the shields of the transition of the cable bundles can be brought to a single bonding point, so that a single high-current clamping device can be used. Also, any tendency for the transition-shield to act as an aerial/antenna can be suppressed by providing an electrical termination at each end of that shield. Any possibility of electrical discharge from high-curvature cut-ends of the wire of the shielding tape, and the risk of mechanical damage presented by them, can be reduced by hemming, or by encasing the ends.

Additional insulation and resistance to abrasion and other mechanical effects may be provided simply by adding additional layers to the shielding tape. Mechanical protection may be modified by the choice or mixture of fibres, and/or their diameters, within a textile layer. More especially, fibres or other non-conductive fibres may be included between some or all of the wire strands 5 in the mesh 2 of the shielding tape 1 to improve the stability of the mesh 2.

As a further possible modification of the shielding tape 1, the layer 3 may be extended round the edge 12 of the mesh 2 to cover the strip 11. When the modified tape 1 is wrapped round the cable-bundle, the extended portion 21 of the layer 3 enhances the integrity of the electrical insulation of the mesh 2 from the cable-bundle, but separates the strip 11 of the mesh 2 from its direct electrical contact with the strip 8. It has been found that this separation does not materially detract from the operation of the shielding tape, especially in relation to high-frequency interference. The closed-circuit encirclement of the bundle by the mesh 2 is now of low impedance with a small capacitative component instead of being solely resistive.

In some circumstances it may not be necessary or desired to provide insulation between the bare mesh 2 and the cables 20, so then a saving in cost and weight can be achieved simply by omitting the inner insulating layer 3 from the tape 1.

The invention claimed is:

1. A method of providing an electrical-cable transition in which a shielded bundle of cables of a cabling run is divided into at least two branch bundles from a main bundle, each of the branch bundles and the main bundle having shielding means for shielding against electromagnetic interference, and continuity of shielding of the cabling run against electromagnetic interference is maintained through the electrical-cable transition by the method comprising: a step of wrapping a flexible shielding element around the branch bundles and the main bundle to envelop them all together at the electrical-cable transition, the flexible shielding element being wrapped around each of the branch bundles in an overlapping relationship with the shielding means of the branch bundles, the overlapping relationship in respect of each the branch bundles comprising one of overlapping the shielding means of the respective branch bundles and being overlapped by individual shielding means of the respective branch bundles; and the step of establishing an electrical interconnection of the flexible shielding element with the individual shielding means of each of the branch bundles to interconnect the shielding means of each of the branch bundles with the shielding means of the main bundle; and the flexible shielding element is an elongate flexible tape that is wrapped widthwise round the branch bundles at the electrical-cable transition with longitudinal margins of the tape overlapping one another, the tape comprising a mesh of electrically-conductive strands with some of those strands running longitudinally of the tape, and retaining the tape wrapped around the branch bundles as aforesaid with the mesh providing a closed electrical-circuit encirclement of the branch bundles via the overlapping margins of the tape.

2. The method according to claim 1, further comprising the step of providing shielding of the main bundle, via the flexible shielding element, before division of the branch bundles from the main bundle at the electrical-cable transition as well as enveloping the main bundle and the branch bundles at the electrical-cable transition.

3. The method according to claim 1, further comprising the step of providing the main bundle with an individual shielding means separate from the flexible shielding element, and establishing the electrical interconnection between the shielding means of the main bundle, the shielding means of the individual branch bundles and the flexible shielding element.

4. The method according to claim 3, further comprising the step of wrapping the flexible shielding element around the main bundle to extend the overlapping relationship of the flexible shielding element to include one of overlapping the shielding means of the main bundle and being overlapped by the individual shielding means of the main bundle.

5. The method according to claim 3, further comprising the step of clamping the flexible shielding element individually to each of the branch bundles and the main bundle.

6. The method according to claim 3, further comprising the step of clamping the shielding mean of the mains bundle and the shielding means of the individual branch bundles all together with the flexible shielding element at the electrical-cable transition.

7. The method according to claim 6, further comprising the step of effecting clamping of the shielding means of the main bundle and the shielding means of the individual branch bundles all together with the flexible shielding element by clamping means for encircling and tightening onto the shielding element and the shielding means of the main bundle and the shielding means of the individual branch bundles.

8. The method according to claim 7, further comprising the step of folding the flexible shielding element back over the clamping means to extend away from the main bundle.

9. The method according to claim 6, further comprising the step of clamping, with the clamping means, the shielding element and the shielding means of the main bundle and the shielding means of the individual branch bundles against an underlying member, and the underlying member comprises one of a rigid member and a resilient member.

10. The method according to claim 9, further comprising the step of extending at least one cable of the main bundle through the underlying member, and the underlying member comprises one of a ring and a collar.

11. The method according to claim 6, further comprising the step of extending the shielding means of the branch bundles as tags, and sandwiching and clamping the tags, the shielding of the main bundle and the flexible shielding element together in electrical contact with one another.

12. The method according to claim 3, further comprising the step of establishing, by flying leads, the electrical interconnection between the shielding means of the main bundle and the shielding means of the branch bundles and the flexible shielding element.

13. The method according to claim 1, further comprising the step of using a woven mesh of electrically-conductive strands as the flexible tape.

14. The method according to claim 1, further comprising the step of shielding each of the branch bundles by wrapping a further elongate flexible tape widthwise around the branch bundle with the longitudinal margins of the further tape overlapping one another, the further tape comprising a mesh of electrically-conductive strands with at least some of those strands running longitudinally of the further tape, and retaining the further tape wrapped around the respective branch bundle as aforesaid with the mesh providing the closed electrical-circuit encirclement of the respective branch bundle via the overlap of the margins of the further tape.

15. The method according to claim 14, further comprising the step of wrapping the further flexible tape widthwise around each of the individual branch bundles comprises a woven mesh of electrically-conductive strands.

16. An electrical-cable transition in which a shielded bundle of cables of a cabling run is divided into at least two branch bundles from a main bundle, each of the branch bundles and the main bundle having shielding means for shielding against electromagnetic interference, wherein the electrical-cable transition comprises: a flexible shielding element wrapped around the branch bundles and the main bundle to envelop them all together as one at the electrical-cable transition, the flexible shielding element being wrapped around each of the branch bundles in an overlapping relationship with the shielding means of the branch bundles at the electrical-cable transition, the overlapping relationship in respect of each of the branch bundle comprising one of overlapping the shielding means of the respective branch bundles and being overlapped by the individual shielding means of the respective branch bundles; and electrical interconnection means to electrically interconnect the flexible shielding element with the individual shielding means of the branch bundles for maintaining continuity through the electrical-cable transition of shielding of the cabling run against electromagnetic interference; the flexible shielding element comprises an elongate flexible tape that is wrapped widthwise around the bundles at the electrical-cable transition with the longitudinal margins of the tape overlapping one another, the tape comprising a mesh of electrically-conductive strands with some of those strands running longitudinally of the tape, and the tape is retained wrapped around the bundles as aforesaid with the mesh providing a closed electrical-circuit encirclement of them via the overlapped margins of the tape.

17. The electrical-cable transition according to claim 16, wherein the flexible shielding element provides shielding of the main bundle before division of the branch bundles from the main bundle at the electrical-cable transition as well as enveloping the main bundle and the branch bundles at the electrical-cable transition.

18. The electrical-cable transition according to claim 16, wherein the main bundle has individual shielding means separate from the flexible shielding element, and the electrical interconnection is established between the shielding means of the main bundle, the shielding means of the individual branch bundles and the flexible shielding element.

19. The electrical-cable transition according to claim 18, wherein the flexible shielding element is wrapped a round the main bundle to extend the overlapping relationship of the flexible shielding element to include one of overlapping the shielding means of the main bundle and being overlapped by the individual shielding means of the main bundle.

20. The electrical-cable transition according to claim 18, wherein the flexible shielding element is clamped individually to each of the branch bundles and the main bundle.

21. The electrical-cable transition according to claim 18, wherein the shielding means of the main bundle and the shielding means of the individual branch bundles are all clamped together with the flexible shielding element at the electrical-cable transition.

22. The electrical-cable transition according to claim 21, wherein clamping means clamps the shielding means of the main bundle and the shielding means of the individual branch bundles all together with the flexible shielding element, the clamping means encircling and tightening onto the shielding element and the shielding means of the main bundle and the shielding means of the individual branch bundles.

23. The electrical-cable transition according to claim 22, wherein the flexible shielding element folds back over the clamping means to extend away from the main bundle.

24. The electrical-cable transition according to claim 21, wherein a clamping means comprises means for clamping the shielding element and the shielding means of the main bundle and the shielding means of the individual branch bundles against an underlying member, and the underlying member comprises one of a rigid member and a resilient member.

25. The electrical-cable transition according to claim 24, wherein the one of the rigid and the resilient member is one of a ring and a collar through which cables of the main bundle pass to the branch bundles.

26. The electrical-cable transition according to claim 21, wherein the shielding means of the branch bundles are extended as tags, and a clamping means sandwiches the tags, the shielding means of the main bundle and the flexible shielding element together in electrical contact with one another.

27. The electrical-cable transition according to claim 18, wherein flying leads electrically interconnect the shielding means of the main bundle, the shielding means of the branch bundles and the flexible shielding element together.

28. The electrical-cable transition according to claim 16, wherein the flexible tape comprises a woven mesh of electrically-conductive strands.

29. The electrical-cable transition according to claim 16, wherein each of the branch bundles is shielded by a further elongate flexible tape that is wrapped widthwise around the bundle with longitudinal margins of the further tape overlapping one another, the further tape comprising a mesh of electrically-conductive strands with some of those strands running longitudinally of the further tape, and the further tape is retained wrapped round the respective branch bundle as aforesaid with the mesh providing a closed electrical-circuit encirclement of the respective branch bundle via the overlapping margins of the further tape.

30. The electrical-cable transition according to claim 29, wherein the further flexible tape wrapped widthwise around each individual branch bundle comprises a woven mesh of electrically-conductive strands.

* * * * *